Sept. 10, 1946.   A. W. WILSON   2,407,464
TRAILER HITCH

Filed Aug. 13, 1945

INVENTOR
ALFRED W. WILSON

ATTORNEY

Patented Sept. 10, 1946

2,407,464

UNITED STATES PATENT OFFICE 2,407,464

TRAILER HITCH

Alfred W. Wilson, New Westminster, British Columbia, Canada

Application August 13, 1945, Serial No. 610,637
In Canada July 2, 1945

5 Claims. (Cl. 280—33.17)

My invention relates to improvements in trailer hitches. The objects of the invention are to provide a simple ball and socket structure as a connector between a motor vehicle and a trailer which can be quickly connected or disconnected without the use of a wrench or other tools and one in which the pulling strain is so directed as to keep the several elements in locked position. A further object is to provide a hitch which allows for all necessary movement between motor vehicle and trailer without increasing the strain on any of the assembled parts and to provide a structure which is not subject to locking due to mud or ice accumulating thereon.

Referring to the drawing.

In the drawing like characters of reference indicate corresponding parts in each figure.

Figure 1:
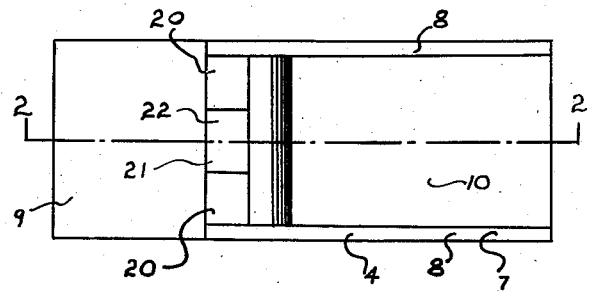
Fig. 1 is a plan view of the invention.
Figure 2:
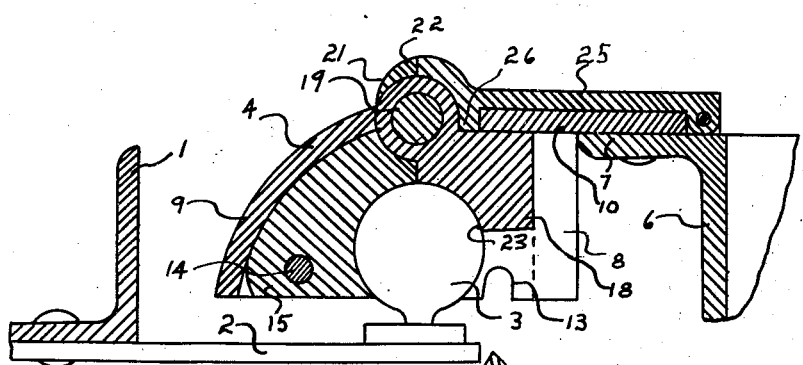
Fig. 2 is a longitudinal sectional view taken on the line 2—2 of Figure 1.

The numeral 1 indicates a rear transverse member attached to a motor vehicle and 2 is a flat plate secured thereto to support an upstanding ball 3 of the hitch 4. The trailer, not shown, is provided with a transverse structural member 6 to which a housing 7 is secured. The housing 7 consists of a pair of side plates 8, one only shown, a curved cover plate 9 bridging the forward ends of the side plates and a flat cover plate 10 at its rear end which extends over and is bolted or otherwise secured to the structural member 6. An opening 12 is defined between the curved cover plate 9 and the flat cover plate 10. The side plates are provided with opposed curved slots as at 13.

Mounted upon a pin 14 extending between the side plates 8 is a block 15 having a recess 16 in its rear face to engage the forward side of the ball 3. A second block 18 is connected to the block 15 by a hinge 19 made up of three hinge barrel portions 20 and 21. The central barrel portion 21 forms part of the block 18 and is provided with a lug 22 which extends above the barrel portions of the hinge portions 20 and 21. The forward block 18 is also provided with a ball recess 23 and is fitted on each side with a pin 24 which normally resides within one of the slots 13.

Hingedly mounted upon the flat cover plate 10 is a keeper 25 having a downwardly projecting lip 26 at its outer end which is adapted to fit between the end of the plate 10 and the hinge barrel portions 20 and 21 to prevent any downward swinging movement of the blocks 15 and 18.

Figure 3:
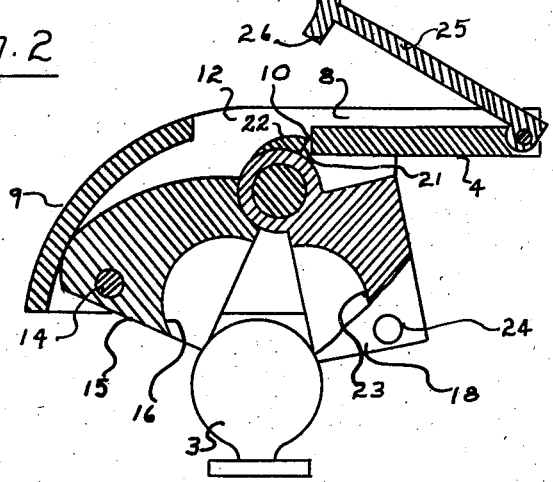
Fig. 3 is a longitudinal sectional view taken on the line 3—3 of Figure 1, showing the disposition of the parts when the hitch is opened.

When it is desired to disconnect the trailer from the motor vehicle, or the housing 7 from the ball 3, the keeper 25 is lifted as shown in Figure 3, the housing is then lifted allowing the blocks 15 and 18 to swing downward about the pin 14 until the pins 24 drop below the slots 13 and the lug 22 hits the edge of the opening 12 at the adjacent end of the flat cover plate 10, when the block 18 is spread sufficiently to allow the ball to drop out of the recesses 16 and still leave the blocks engaged within the housing 7.

To close the blocks about the ball, the process is entirely reversed and as soon as the keeper is pressed down into position, the component parts of the hitch 4 are locked in position and since all the pulling strains of the motor vehicle are on a horizontal line through the centre of the ball 3 and above the pins 14 and 24 there is no possibility of the hitch being disconnected until the keeper is manually lifted.

What I claim as my invention is:

1. A trailer hitch comprising a ball adapted for connection to one vehicle and a housing adapted for connection to another vehicle, said housing comprising a box-like structure having side walls and an end wall, a pair of blocks hingedly connected together and having complementary recesses adapted to engage the ball, one of said blocks being pivotally mounted on a pin extending between said side walls of the housing and releasable means for engaging one of the blocks to retain both blocks within the housing.

2. A trailer hitch comprising a ball adapted for connection to one vehicle and a housing adapted for connection to another vehicle, said housing comprising a box-like structure having side walls and an end wall, a pair of blocks hingedly connected together and having complementary recesses adapted to engage the ball, one of said blocks being pivotally mounted on a pin extending between said side walls of the housing and releasable means for engaging one of the blocks to retain both blocks within the housing, said pivot pin being positioned below the centre of the complementary recesses when said blocks are within the housing.

3. A trailer hitch comprising a ball adapted for connection to one vehicle and a housing adapted for connection to another vehicle, said housing comprising a box-like structure having side walls and an end wall, a pair of blocks hingedly connected together and having complementary recesses adapted to engage the ball, one of said blocks being pivotally mounted on a pin extending between side walls of the housing and releasable means for engaging one of the blocks to retain both blocks within the housing, the block mounted upon a pin between the housing side walls being so placed within the housing as to bear against the end wall when said blocks are within the housing.

4. A trailer hitch comprising a ball adapted for connection to one vehicle and a housing adapted for connection to another vehicle, said housing comprising a box-like structure having side walls and an end wall, a pair of blocks hingedly connected together and having complementary recesses adapted to engage the ball, one of said blocks being pivotally mounted on a pin extending between side walls of the housing and releasable means for engaging one of the blocks to retain both blocks within the housing, said releasable retaining means being a keeper having a transverse hinge, the free end of said keeper lying in the downward path of the hinge connecting the blocks together when said blocks are within the housing.

5. A trailer hitch comprising a ball adapted for connection to one vehicle and a housing adapted for connection to another vehicle, said housing comprising a box-like structure having side walls and an end wall, a pair of blocks hingedly connected together and having complementary recesses adapted to engage the ball, one of said blocks being pivotally mounted on a pin extending between said side walls of the housing and releasable means for engaging one of the blocks to retain both blocks within the housing and a lug extending upwardly above one of the blocks adapted to engage a part of the housing when said blocks are released from ball engagement to prevent either of said blocks from dropping entirely clear of the housing.

ALFRED W. WILSON.